FIG 3.
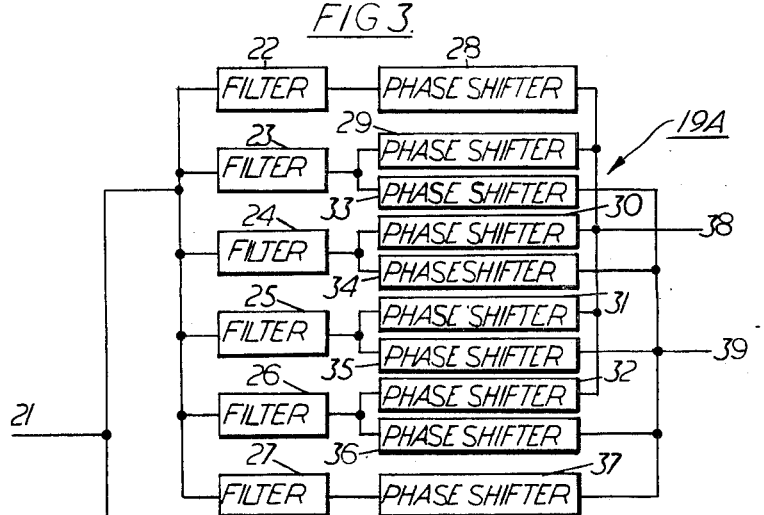
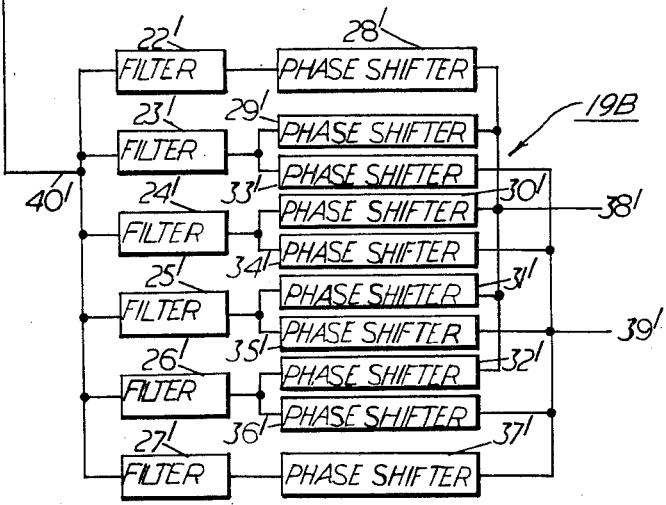
Inventor
Y. Kagawa-Y. Ishizaki
By *[signature]*
Attorney United States Patent Office 3,202,989
Patented Aug. 24, 1965

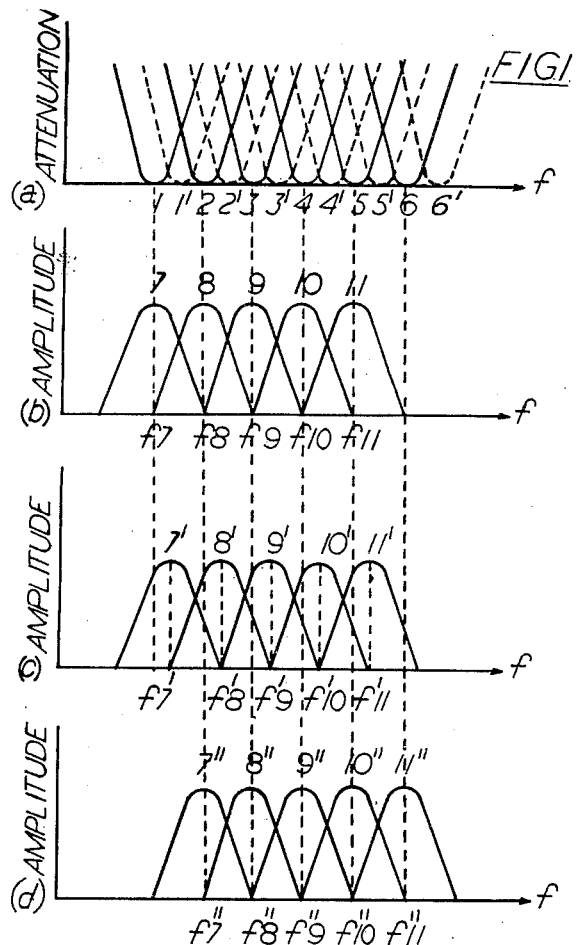
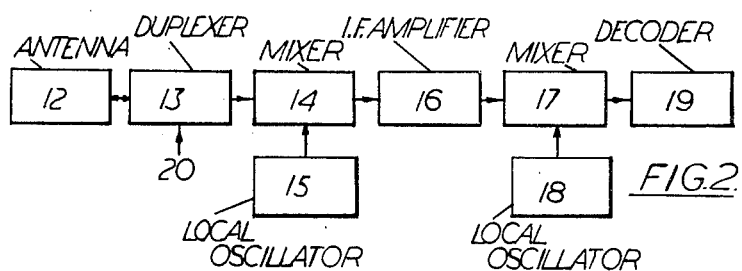

3,202,989
PULSE COMPRESSION RADAR RECEIVER FOR RANGING MOVING TARGETS
Yoichi Kagawa and Yasutoshi Ishizaki, both of Tokyo, Japan, assignors to Nippon Electric Company, Limited, Tokyo, Japan, a corporation of Japan
Filed July 6, 1961, Ser. No. 123,382
Claims priority, application Japan, July 7, 1960, 35/30,754
4 Claims. (Cl. 343—17.2)

This invention relates to a receiver of a radar system using pulses of a wide width which are modulated in a particular manner instead of simple sharp pulses.

In such systems, distance accuracy is improved by filters connected effectively in parallel. Their outputs are caused to pass through the respective phase-shift circuits which correspond to the spectra obtained by the modulation within the wide-width pulses and then added to produce a pulse shorter than the sent pulse, whereby the accuracy of the distance is increased. The filters are used in common for the Doppler frequency shifts caused by the movement of a target.

Assuming that the gain of the antenna, the propagation characteristic of the electromagnetic wave, and the noise figure of a receiver are all constant, the maximum range of a radar depends, not on the peak power at the sending time, but on the total transmitting power during the storage time in the receiver. Since the storage time is related to the speed of detection it is not desirable to make it too long. If this is kept constant, the average power at the transmitter must be raised in order to raise the maximum range. The average power is represented by the product of the peak power, the pulse width, and the pulse repetition frequency, which is limited by the maximum range.

On the other hand, the peak power is limited by the transmitting tube. Therefore, it has been proposed in a radar for long range detection to raise the average power by broadening the pulse width. However, while broadening of the pulse width will narrow the band of the spectrum of the transmitting signal, when received by a narrow band receiver, it will decrease the ranging accuracy. It has therefore been proposed as described in the specification of the patent application Serial No. 8,817, filed Feb. 15, 1960, now U.S. Patent No. 3,154,782, to broaden the band width of the transmitted wave, without raising the peak power, by phase modulating the pulses so as to make the side bands of the transmitting wave have a specified phase relationship, by separating these side bands with filters in the high-frequency or intermediate frequency part of the receiver and by making the phases of these side bands coincide with one another with a phase-shift circuit.

In this case, the phases of all components of the broad band spectra are not in phase at any instant, and are in such a phase relation that a pulse with a high peak value can never be formed at the transmitter. Consequently, it is possible to form a narrow band pulse in the receiver by making all the phases of the spectra coincide in time with one another by means of a decoding circuit formed with linear circuits corresponding to the modulation at transmitter, and thus raise the accuracy of the measurement by measuring the time lapse between an instant of transmission and that of the narrow pulse.

However, the frequency of the signal reflected by a target, and received by the receiver, changes by the Doppler effect due to the movement of the target. Consequently, the frequency of the signal entering the decoding circuit of the receiver will be shifted and the phase of the components of such a frequency-shifted signal can not be made to coincide with one another in the decoding circuit, with the result that a narrow pulse is not formed. This necessitates use of a plurality of decoding circuits of different frequencies in order to detect a moving target.

According to this invention a simple radar receiver is provided for ranging even a moving target by using a common filter which is the main part of the decoding circuit.

In general, a signal modulated within a pulse can be considered to be obtained by first modulating a continuous wave with a particular modulation (e.g. frequency modulation), and then modulating it with a pulse.

Let the pulse width of pulse modulation be $\tau$. If the modulated signal is considered as formed by taking out the modulated signal having the repetitive period $\tau$ by pulse modulation of the pulse width $\tau$, the frequency spectrum of the modulated signal only is a set of line spectra which are spaced by $1/\tau$ with one another and have predetermined phase relations with respect to one another. When the pulse modulation is applied, it results in each line spectra broadening until the width corresponds to the pulse of the width $\tau$. Consequently, to make all these spectra in-phase, filters which have band widths corresponding to the pulse modulation and which have center frequencies equal to the frequencies of the line spectra corresponding to the modulation are connected in parallel and phase-shift circuits corresponding in number to the respective phases of the line spectra are connected in cascade to the filters, and the outputs are combined in-phase.

The above-mentioned and other features and objects of this invention and the manner of attaining them will become more apparent by reference to the following description taken in conjunction with the accompanying drawings, wherein:

FIG. 1 shows the relations between the characteristics of the filters used in the decoding circuit of a receiver of this invention and the spectra of the reflected signal of the radar system;

FIG. 2 is a block diagram of a receiver of this invention.

FIG. 3 is a block diagram of a decoding circuit which constitutes the main part of the receiver of this invention.

Figure 4:
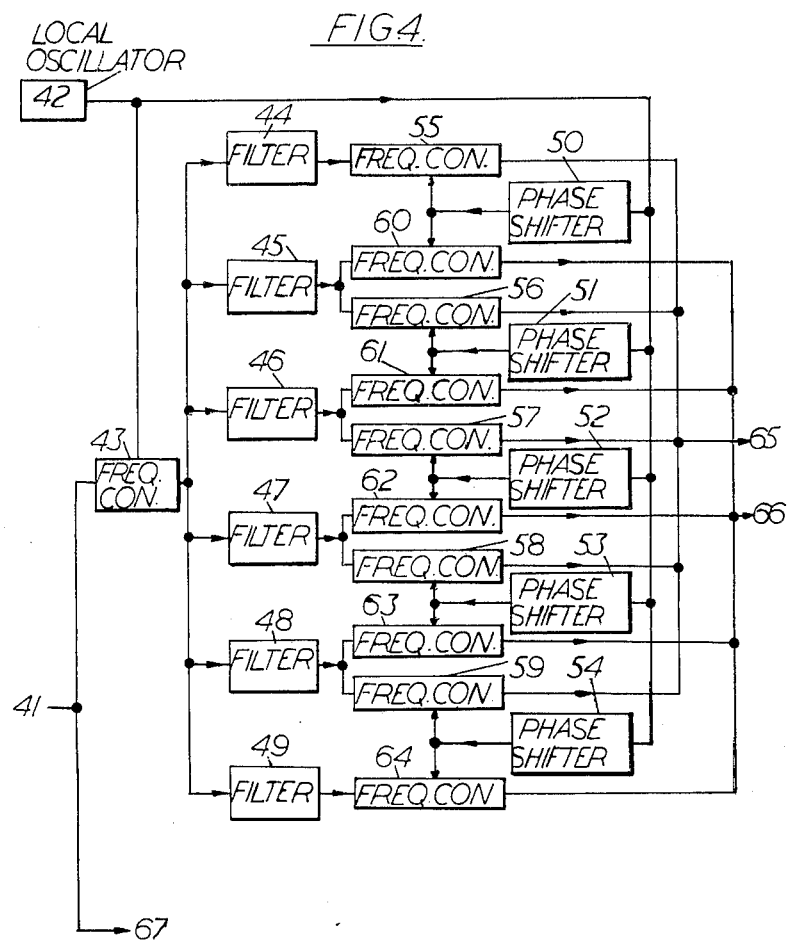
FIG. 4 is a block diagram of another example of the decoding circuit.

When a signal subjected to Doppler frequency shift enters the decoding circuit consisting of the above-mentioned filters and phase-shift circuits, there occur shifts between the filters and the corresponding signal spectra, so that the resultant output decreases. Explaining by the drawings, FIG. 1 shows the relation of the set of filters and the signals, with the frequency $f$ plotted as the abscissas. Curve ($a$) shows by solid lines 1 to 6 the attenuation characteristics of one set of the parallel connected filters. Curve ($b$) shows the spectra of the reflected signal, when not subjected to Doppler deviation, where $f_7$, $f_8$, $f_9$, $f_{10}$, and $f_{11}$ are the frequencies of the line spectra without pulse modulation. These spectra will broaden as shown by 7, 8, 9, 10, and 11 due to the pulse modulation. The phases of these parts are different from one another as explained before. This signal passes through the filters 1, 2, 3, 4, and 5 which have the characteristics shown in curve ($a$) and then they are made in-phase by the phase-shift circuits corresponding to the filters. In this case the filter 6 is not needed, and is not connected to the output terminal.

When the reflected signal is subjected to the Doppler shift, the spectra 7, 8, 9, 10, and 11 shift by the amount of the Doppler shift, and become 7′, 8′, 9′, 10′, and 11′ as shown in curve ($c$). If the shift is small, most of each spectrum passes through the corresponding filter, so that the decrease of the output is very little. However, if the shift becomes large and the center frequencies $f'_7$, $f'_8$, $f'_9$, $f'_{10}$, and $f'_{11}$ of 7', 8', 9', 10' and 11', fall between the frequencies of filters 1 and 2, 2 and 3, 3 and 4, 4 and 5, and 5 and 6, respectively, then nearly half of the energy of each spectrum passes through the corresponding filter, but the other half passes through the next adjacent filter. Since there is no correspondence between the spectrum and the phase-shift circuit connected to the filter for energies which pass the two successive filters, there is no in-phase component on the output side. This makes the in-phase energy component to be added together small, with the result that the output decreases.

To prevent this, another set (group) of filters 1', 2', 3', 4', 5', and 6', shown in curve (a) by broken lines, are additionally provided between the filters 1, 2, 3, 4, 5, and 6. The outputs are combined through phase-shift circuits which have the same phase characteristics as the phase-shift circuits connected to 1, 2, 3, 4, and 5, respectively, to produce an output pulse of a narrow width at a second output terminal. Further increase of the Doppler frequency deviation make the spectra 7, 8, 9, 10, and 11 move to 7", 8", 9", 10", and 11", respectively, as shown in FIG. 1(d). Then, these spectra will pass through the filters 2, 3, 4, 5, and 6, respectively. However, the phase-shift circuits connected to the filters 2, 3, 4, and 5 corresponds to the spectra 8, 9, 10, and 11, respectively, and the filter 6 has not yet been necessary to receive the spectra 7, 8, 9, 10, and 11, and hence has not in fact, been connected. Therefore, the spectra 7", 8", 9", 10", and 11" of the signal coming through the filters 2, 3, 4, 5, and 6 can not be combined to be in-phase, with the result that a pulse of a high peak and a narrow width can not be formed at the output terminal.

In the receiver of this invention, another set of phase-shift circuits are connected to the filters 2, 3, 4, 5, and 6, for adding the spectra 7", 8", 9", 10", and 11" in such a way as to make them in-phase and for producing a pulse of a high peak and a narrow width at another output terminal.

FIG. 2 is a system diagram of a receiver of this invention. 12 is an antenna, 13 is a duplexer, 20 is the input terminal for the signal to be sent from the transmitter via the duplexer 13 and the antenna 12. Since the transmitter has no direct relation with this invention, the parts prior to 20 are omitted in the drawing.

During reception, the signal reflected from the target passes through the antenna 12 and the duplexer 13, is mixed in the mixer 14 with the output of a local oscillator 15 and converted to a signal of an intermediate frequency, and is amplified by an intermediate frequency amplifier 16. Since the frequency band convenient for the filter arrangement is generally lower than the frequency band convenient to the intermediate frequency amplifier, the amplified signal is again mixed in a second mixer 17 with the output of a second local oscillator 18, to be frequency-converted and then supplied to a decoding circuit 19 consisting of the filters and phase-shift circuits.

FIG. 3 shows a system diagram of the decoding circuit 19 shown in FIGURE 2. The decoder 19 is shown in FIGURE 3, for example, to consist of two separate decoding units 19A and 19B connected to the input 21. In this figure, 21 is an input terminal corresponding to the output of the mixer 17; 22, 23, 24, 25, 26, and 27 are filters of decoding unit 19A whose attenuation characteristics are shown by 1, 2, 3, 4, 5, and 6 in FIG. 1; and 28, 29, 30, 31, and 32 are phase-shift circuits of decoding unit 19A corresponding to the spectra 7, 8, 9, 10, and 11 of FIG. 1. The phases of 7, 8, 9, 10, and 11 which passed through and been separated from one another by the filters 22, 23, 24, 25, and 26 are caused to be in-phase at some instant by the phase-shift circuits. Such spectra are combined on the output side of the phase-shift circuits. This composed output appears at an output terminal 38. With no Doppler deviation, this output becomes a pulse of a high peak and a narrow width. Phase shifters 33, 34, 35, 36, and 37 of decoding unit 19A which cause the same relative phase shifts as 28–32, but for greater frequency deviations, like those of FIG. 1(d), are also provided.

As shown in FIG. 1, when the spectra move over even a wider frequency deviation to 7", 8", 9", 10", and 11" by the Doppler shift, these spectra are combined so as to become in-phase at some instant by the phase-shift circuits 33, 34, 35, 36, and 37 after they have passed through the filters 23, 24, 25, 26, and 27, respectively, and a pulse of a high peak and a narrow width is produced at an output terminal 39. Filters 22'–27', of decoding unit 19B corresponding to 1', 2', 3', 4', 5', and 6' of FIG. 1(a), are connected to 40' in parallel on one side and are connected at their opposite sides through phase-shift circuits 28'–37' to other output terminals 38' and 39' respectively, so as to produce an output of a high peak narrow width pulse at an intermediate Doppler deviation.

The decoding unit 19B is provided in order to prevent a decrease in the amplitudes of the narrow band output pulses, particularly if the reflected wave has been subjected to an intermediate Doppler frequency deviation. It will be obvious, that if this amplitude degradation can be tolerated in the system, then the decoding unit 19B can be eliminated.

A summary of the operation of the decoding circuit shown in FIG. 3, is as follows:

Each decoder unit 19A and 19B is connected to receive the input signals from terminal 21. Each decoding unit has a group of filters (22–27; and 22'–27') connected to filter the supplied input signals. In each decoding unit two separate groups of phase shifters (28–32 and 33–37 in 19A and 28'–32' and 33'–37' in 19B) are respectively connected to receive the output from the group of filters in said unit. Thus, in unit 19A a first group of phase shifters 28–32 will be allotted for example, to phase shift spectra 7–11 of FIG. 1 whereas the second group of phase shifters 33–37 will be allotted, for example, to phase shift spectra 7"–11" of FIG. 1.

From the foregoing, it is obvious that although FIG. 3 shows only two decoding units 19A and 19B, more decoding units could be provided as necessary. Moreover, although each decoding unit 19A or 19B is shown to have only six filters and 10 phase shifters, it is to be understood that these numbers are dependent on the number of spectra components in the input signal and will vary with said number of spectra components.

Thus, for example, in the embodiment shown in FIG. 3, the number of spectra was assumed to be five (5). Additionally, the Doppler frequency deviation expected was assumed to be unity (see FIG. 1(d)). Thus, to obtain a generalized statement as to the number of filters required in each decoding unit (19A and 19B) of FIG. 3 and as shown in FIG. 4 (to be explained in detail hereinafter), the number of filters required is the number of spectra components plus the anticipated deviation. Thus, if $n$=the number of spectra components and $m$=the anticipated Doppler deviation, then: the number of filters=$n+m$. Similarly in FIGURES 3 and 4, the number of phase shift means in each group is seen to be equal to $n$, that is, the number of spectra in the input signal. In FIG. 3, the number of groups of phase shifters (and similarly in FIG. 4, the number of groups of frequency converters) is seen to be one greater than the anticipated Doppler frequency deviation or $m+1$ and since the deviation was assumed to be unity, the number of groups required is two. The groups of phase shifters (FIG. 3) (or frequency converters connected to phase shifters in FIG. 4) will be referred to hereinafter as "phase shift means."

FIG. 4 shows a system diagram of another decoding circuit in which this invention is carried into effect in such a manner that the phase-shift effect is provided not by passing the signal through a phase-shift circuit, but by changing the frequency of the signal for the first time before passing the spectrum through a filter and then changing the frequency for the second time back to the original frequency and by providing a phase difference between the carrier waves for use in these two frequency-conversions. 41 is an input terminal of the reflected signal in the form of an intermediate frequency signal (see FIG. 2), 43 is a modulator for frequency conversion, and 42 is an oscillator of carrier waves for the frequency conversion. The output of 43 is the difference between the input signal and the oscillation frequency of 42. Filters 44, 45, 46, 47, 48, and 49 correspond to 22, 23, 24, 25, 26, and 27 of FIG. 3, with the center frequencies lowered respectively by the oscillation frequency of 42 so that the signal whose frequencies have been converted may just pass through. Modulators 55, 56, 57, 58, and 59 are provided for the second frequency conversion, and are supplied with the output of 42 as modulation carrier waves, through phase-shift circuits 50, 51, 52, 53, and 54. Since the outputs of the modulators are the sums of the two frequencies, the frequencies are changed back to the same one as that of each partial spectrum in 41. The frequency of the partial spectrum passing through 55, for example, is changed back to the original one by modulation by 43 and that by 55, but the phase of the modulation carrier wave for 55 is different from that for 43 due to the phase-shift circuit 50. Hence, the partial spectrum passing through 55 is subject to phase shift by an amount equal to the phase shift of the modulation carrier wave by the phase-shift circuit 50. Consequently, if the phase shift of 50 is equal to that of 28 in FIG. 3 and similarly the phase shifts of 51, 52, 53 and 54 are equal to that of 29, 30, 31 and 32, then the change to which the signal is subjected when it passes from 21 to 38 in FIG. 3 can be made exactly equal to the change to which the signal is subjected when it passes from 41 to 65 in FIG. 4. In order to provide in this circuit the output terminal for the signal having the Doppler shift with filters in common, modulators 60, 61, 62, 63, and 64 for frequency conversion are provided. Since, as explained before, the phase shifts of the phase shift circuits 33, 34, 35, 36 and 37 in FIG. 3 are equal to that of the phase-shift circuits 28, 29, 30, 31 and 32, the same output is obtained at an output terminal 66 in FIG. 4 as at the output terminal 39 in FIG. 3 by using the phase-shift circuits 50, 51, 52, 53 and 54 themselves and by applying their outputs to the modulators for frequency conversion which are connected to the output side of the adjacent filters, respectively. Line 67 corresponds to line 40 of FIG. 3 and is connected to the decoding circuit for the intermediately Doppler shift signal which is a duplicate of that shown except for the value of the phase shifts. In FIG. 4 the number of filters, the number of groups of frequency converters and the number of frequency converters in each group has been determined in a manner similar to that explained in connection with FIG. 3.

In the above explanation, a case in which the number of spectra is five has been explained for simplicity, but in practice, there will be more spectra. Furthermore, the Doppler shift (hereinabove referred to as the Doppler deviation symbolized by $m$) considered has amounted at the maximum to the frequency difference between the adjacent filters (that is, a Doppler deviation of unity, or $m=1$), but for a larger Doppler deviation, the number of filters may further be increased and not only two, but more phase-shift circuits may be connected to one filter, to obtain many outputs for a broad range of Doppler shifts.

It is to be noted that the filters to be added for a broad range Doppler shift are only two at both ends, with the result that if the number of spectra is large, the number of filters increased is of no problem as compared with the number of filters required for no Doppler shift.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In a radar system wherein the transmitted signal comprises a relatively wide pulse having at least $n$ different frequency components in a predetermined phase relationship and in which said signal is subject to Doppler frequency shifting; a radar receiver comprising:
   (A) an input circuit for receiving and supplying echos of said transmitted signals;
   (B) a decoding circuit including at least one decoding unit connected to receive the echo signals from said input circuit, each of said decoding units having:
      (1) $n+m$ filters each having a preselected pass characteristic, connected in parallel to receive said echo signals, where $m$ is an integer determined by the anticipated Doppler frequency deviation,
      (2) $m+1$ separate groups of phase shift means connected to receive the outputs of said filters, each of said groups having $n$ individual phase shift means with at most one of said individual phase shift means of said group being connected to one of said filters;
   (C) a separate output terminal for each of said groups, each of said output terminals being connected to combine the outputs of all the individual phase shifting means in the group connected thereto;
whereby said $n$ different frequency components are all derived in phase at a given instant from at least one of said output terminals.

2. A radar receiver according to claim 1 wherein each of said individual phase shifting means comprises a phase shifter connected between a filter and an output terminal.

3. In the radar system as set forth in claim 1 wherein a first frequency converter is connected between said input circuit and all said $n+m$ filters; and wherein each of said individual phase shift means includes: a second frequency converter connected between one of said $m+n$ filters and one of said output terminals, a phase shifter which is connected in common to $m+1$ of said individual phase shift means, and a local oscillator connected to said first frequency converter and to each of said second frequency converters through said common phase shift means.

4. A radar receiver for receiving echos of relatively wide band transmitted pulses having at least $n$ frequency components in a predetermined phase relationship and wherein the received signal has been subjected to Doppler frequency shifting, said receiver comprising:
   (A) an input circuit for receiving said echo signals;
   (B) a decoding circuit connected to said input circuit, said decoding circuit including:
      (1) at least one decoding unit, each decoding unit having an input terminal connected to receive the echo signals from said input circuit, each decoding unit having:
         (a) a group of more than $n$ filters, each having a predetermined pass characteristic connected to said input terminal,
         (b) at least two separate groups of phase shift means connected to said filters, each of said groups having $n$ individual phase shift means with at most one of said individual phase shift means of said group being connected to one of said filters,
            (i) at least one of said individual phase shift means of each group being the only means connected to receive the output of one of the filters of said group of filters;
         (c) a separate output terminal for each group of phase shift means, each of said terminals being connected to receive and combine the outputs of all the individual phase shift means in the group connected thereto whereby said $n$ different frequency components are all derived in phase at a given instant from at least one of said output terminals.

References Cited by the Examiner

UNITED STATES PATENTS 2,952,808  9/60  Hurvitz _____ 250—20.37

CHESTER L. JUSTUS, *Primary Examiner.*

ROY LAKE, DAVID G. REDINBAUGH, *Examiners.*